Patented Mar. 9, 1954

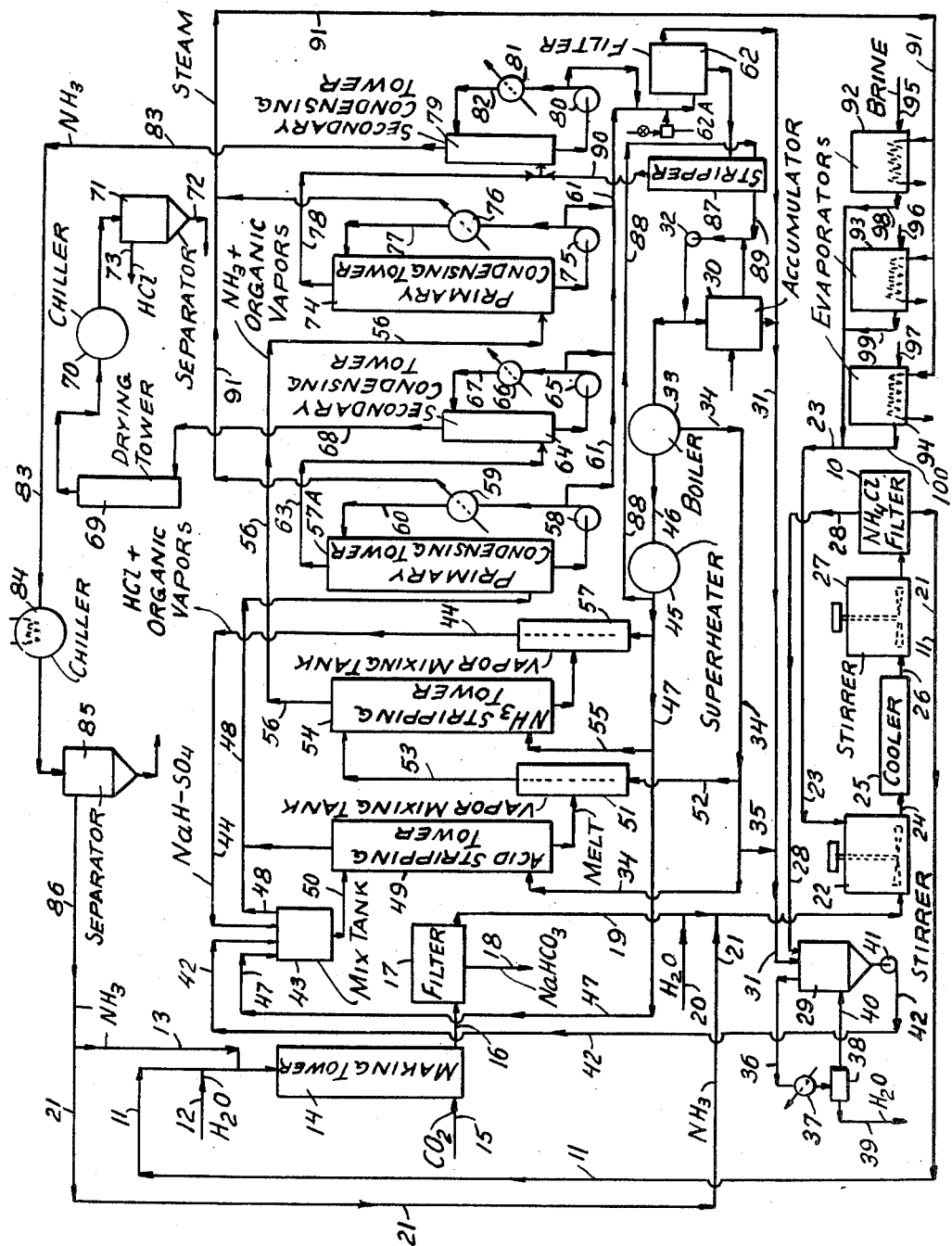

2,671,713

UNITED STATES PATENT OFFICE 2,671,713

SEPARATION AND USE OF AMMONIUM CHLORIDE IN THE AMMONIA SODA PROCESS FOR PRODUCING SODIUM BICARBONATE

Warren Standish Miller, Houston, Tex., and Louis C. Hirdler, Maplewood, La., assignors to Mathieson Chemical Corporation, a corporation of Virginia Application November 18, 1952, Serial No. 321,162

1 Claim. (Cl. 23—65)

Our invention relates to an integrated process for the production of ammonia, hydrogen chloride and sodium bicarbonate. More particularly, our invention provides for the production of sodium bicarbonate, together with crystallized ammonium chloride as a by-product, in an improved ammonia-soda process with subsequent dissociation of the ammonium chloride into ammonia, for recycle, and hydrogen chloride.

As is well-known, the ammonia soda process is operated commercially to produce sodium bicarbonate through a double decomposition reaction involving sodium chloride and ammonium bicarbonate produced by saturating a nearly saturated sodium chloride brine with ammonia and with carbon dioxide. The sodium bicarbonate is crystallized out of solution and is ordinarily converted by calcination to sodium carbonate. The liquor remaining after the separation of the sodium bicarbonate contains ammonium chloride in addition to ammonium bicarbonate and sodium chloride.

Many attempts have been made to work up the mother liquor to separate ammonium chloride in solid form so that the residual liquid may be used again for the preparation of sodium bicarbonate. However, commercial operators of the ammonia-soda process conventionally treat the liquid remaining after bicarbonate separation with lime in order to recover ammonia and ultimately discard a portion of the usable salt and all of the chlorine involved in the process as chloride ion.

Copending application Serial No. 248,190, filed September 25, 1951, now Patent No. 2,622,004, issued December 16, 1952, of Warren Standish Miller and Louis C. Hirdler describes a cyclic two-stage process for the production of sodium bicarbonate and crystallized ammonium chloride which utilizes particular operating procedures and limiting conditions. The process is characterized by establishing a cycle in which the composition of the circulating liquor is controlled by split addition of the ammonia required in a particular manner while adding the usual equimolar quantities of sodium chloride, in the form of the solid salt, carbon dioxide and water and while removing equivalent quantities of crystallized sodium bicarbonate and ammonium chloride.

The liquor containing sodium, ammonium chloride, hydroxide and bicarbonate ions is circulated between a sodium bicarbonate producing stage and an ammonium chloride producing stage. Carbon dioxide is added to the ammoniated, salt-containing liquor in the sodium bicarbonate producing stage in an amount producing a ratio of bicarbonate to the sum of bicarbonate and hydroxide ions of about 0.60 to 0.80, and the temperature of the liquor is controlled at about 28° to 60° C., preferably 40 to 50° C., while separating crystallized sodium bicarbonate. The recovered liquor is circulated to the ammonium chloride producing stage, and less than the molar requirement of make-up water for a complete cycle is added. Approximately half but less than the molar requirement of ammonia for the double decomposition reactions of the complete cycle also is added to the circulating liquor until the ratio of bicarbonate to the sum of bicarbonate and hydroxide ions is about 0.37 to 0.42. Sodium chloride in the form of solid salt is added to the circulating liquor, and the temperature of the liquor is controlled at about 20° to 40° C. while dissolving the salt and separating crystallized ammonium chloride. The remaining make-up of water and ammonia are added to the resulting liquor which is then circulated to the sodium bicarbonate producing stage.

Copending application Serial No. 242,151, filed August 16, 1951, of Carl F. Prutton, Warren Standish Miller and Louis C. Hirdler describes a process for the dissociation of ammonium chloride which is characterized by subjecting a hot melt of bisulfate to which ammonium chloride is added to separate stripping stages from which hydrogen chloride and ammonia are successively removed. Heat required for the dissociation is supplied by use of an organic medium which is separately heated in a conventional boiler or tube type heater.

A melt of an alkali metal or ammonium bisulfate containing about 0.15 to 0.75 mole of ammonium chloride per mole of bisulfate is circulated through a hydrogen chloride stripping zone and then through an ammonia stripping zone. Ammonium chloride is added to the melt to maintain the desired operating concentration. A temperature of about 220° to 270° C. is maintained in the hydrogen chloride stripping zone. A temperature of about 330° to 380° C. is maintained in the ammonia stripping zone. A vapor overhead stream and a stripped melt stream are separately removed from each stripping zone. The process heat is supplied by direct transfer from an inert thermally stable fluid organic medium to the circulating melt mixture. All the process heat required may be introduced into the system in a boiler for the organic liquid and superheater for the organic vapors. All the required heat of reaction is transferred by direct contact of the organic liquid and its vapors to the reacting melt. No heat transfer surfaces for the introduction of heat are required except in the boiler and superheater. In addition, a substantial amount of heat is recovered in the form of steam in the condensing systems for condensing the organic stripping medium from the respective vapor streams from the hydrogen chloride and ammonia stripping stages.

Although the improved ammonia-soda process of Serial No. 248,190 results in the recovery of the chloride ion in the form of by-product ammonium chloride, solid salt is required for the process and is expensive compared to brine because of commercial fluid techniques of mining salt and the availability of concentrated brines from natural brine wells which is an important factor in the economics of ammonia-soda processing. By integrating the solid salt process for ammonium chloride recovery with the ammonium chloride melt dissociation process we have been able to recover waste heat in the dissociation process in a manner permitting production of sufficient solid salt to maintain the modified ammonia-soda process in balance and provide an overall process in which the products are produced in ultimate yield at reduced cost.

According to our integrated process an aqueous liquor containing sodium, ammonium, chloride, hydroxide, and bicarbonate ions is circulated between a sodium bicarbonate producing stage and an ammonium chloride producing stage, carbon dioxide is added to the ammoniated salt containing liquor in the sodium bicarbonate producing stage, and crystallized sodium bicarbonate is separated. Less than the molar requirement of make-up water for the complete cycle is added to the liquor which is recovered and circulated to the ammonium chloride producing stage. Approximately ½ but less than the molar requirement of ammonia is added to the circulating liquor, and solid sodium chloride is added while controlling the temperature of the liquor. Crystallized ammonium chloride is separated and dried. The remaining make-up water and ammonia are added to the liquor recovered and the liquor is circulated back to the sodium bicarbonate producing stage. The ammonium chloride, advantageously as a slurry in an inert thermally stable organic liquid, is mixed with the melt of bisulfate. The ammonium chloride containing melt is subjected to stripping in successive hydrogen chloride and ammonia stripping zones. The stripping temperatures in the hydrogen chloride and ammonia stripping zones are controlled by direct injection of externally heated vapors of the organic liquid. A vapor stream and the partially stripped melt are separately removed from the hydrogen chloride stripping zone, a vapor stream and the stripped melt are separately removed from the ammonia stripping zone and the stripped melt is returned to the mixing zone. The vapor stream removed from each stripping zone is introduced into a condensing tower of a multi-stage condensing system in which a portion of the vaporized organic liquid is condensed by contact with relatively cool organic liquid. Organic condensate is withdrawn from the condensing tower and is passed through a waste heat recovery unit. The cooled condensate then may be returned to the condensing tower. The effluent from the condensing tower is passed to at least one subsequent condensing tower in which the remainder of the vaporized organic liquid is condensed with relatively cool organic liquid. Organic condensate is withdrawn from the second condensing tower, passed through a cooler and may be returned to the condensing tower. Hydrogen chloride and ammonia are separately recovered and condensed organic liquid above that necessary to operate the condensing-steam generating system is returned to the dissociation process. Steam generated in the waste heat recovery unit is passed to a brine evaporation zone in which solid sodium chloride required for addition to the ammonium chloride recovery process is produced.

The heat available from the recovery system of the ammonium chloride dissociation process will depend on the operating conditions and the heat transfer medium selected for the process. For this reason, we prefer to use an organic liquid which is substantially stable at 500° C. or higher, for example chlorinated aromatics such as chlorobenzene, orthodichlorobenzene and trichlorobenzene, particularly a stabilized orthodichlorobenzene, such as (Dowtherm E). Also we prefer to maintain a temperature of about 220° to 270° C. in the hydrogen chloride stripping zone and a temperature of about 330° to 380° C. in the ammonia stripping zone. As an example, when trichlorobenzene is employed as the organic heat transfer medium and the above stripping temperatures are maintained in the stripping zones, 28,000 pounds of saturated 20 p. s. i. g. steam may be produced per ton of hydrogen chloride by passing the vapors from both stripping zones through separate multi-stage condensing systems if all of the sensible heat is removed from each of the first condensing towers of the multi-stage condensing systems. The steam required for the production of dry salt by the evaporation of saturated brine in several single effect evaporator bodies is 6700 pounds per ton of dry salt produced which is equivalent to 14,000 pounds of low pressure steam per ton of hydrogen chloride. About two tons of dry salt are required per ton of hydrogen chloride gas produced in the integrated process of our invention. Since at least 50 per cent of the available heat from each of the first condensing towers of the multi-stage condensing systems can be converted to low pressure steam, the integrated process may be conveniently maintained in thermal balance.

The operation of our invention will be further described by reference to the accompany drawing which represents schematically a simplified flow diagram of the essentials of the processing system.

In the drawing an aqueous liquor containing sodium, ammonium, chloride, hydroxide and bicarbonate ions circulates continuously from ammonium chloride filter 10 through making tower 14 to sodium bicarbonate filter 17 and thence through mixing tank 22, cooling equipment 25 and mixing tank 27 back to filter 10. The addition of a part of the required makeup water is shown diagrammatically through line 12 to the liquor recovered from filter 10 and circulating in line 11. The water is advantageously added in the form of washings from the crude ammonium chloride filter cake separated by filter 10. Ammonia is added to the liquor circulating through line 11 by means of connection 13. The circulating liquor is introduced to making tower 14 to which carbon dioxide is charged as indicated by means of line 15. Temperature control is provided in the usual manner in making tower 14 to prevent a temperature rise above about 60°

C. The carbonated liquor is circulated through line 16 to filter 17 for removal of crystallized sodium bicarbonate. The crude sodium bicarbonate leaving line 18 may be passed after washing in the usual manner to a calciner (not shown) for production of soda ash.

Water is added to the liquor recovered from filter 17 and circulated through line 19 by means of connection 20. Advantageously the water is added in the form of washings from the crude sodium bicarbonate filter cake. Ammonia is added to the liquor circulated in line 19 by means of connection 21. Sodium chloride in the form of the solid salt is added as indicated by line 23 to the aqueous liquor in mixing tank 22. The liquor from tank 22 is circulated through line 24, cooler 25 and line 26 to a second mixing tank 27 in which time is provided for complete solution of the sodium chloride and precipitation of ammonium chloride. The liquor from the mixing tank 27 then is passed to filter 10 for removal of precipitated ammonium chloride.

For the carbonation step, conventional making towers of the type employed in the ammonia-soda process may be used for producing the sodium bicarbonate. The temperature rise due to the ammoniation step prior to carbonation and the carbonation itself is employed to bring the temperature of the liquor to the desired range for filtering the sodium bicarbonate. Undue temperature rise is avoided and temperature is readily controlled in our process by means of the usual cooling facilities operated in connection with conventional making towers. The bicarbonate filter liquor then can be cooled with ordinary cooling water in conventional cooling equipment to the temperature desired for ammonium chloride precipitation and filtration. As shown in the drawing, the cooling appears to follow the salt addition, but it may be desirable to pre-cool the bicarbonate filter liquor to the temperature desired for ammonium chloride precipitation, e. g. 30° C., before the addition of salt. After the addition of salt, ammonium chloride begins to precipitate and a small amount of additional cooling then is required to maintain the desired temperature.

The sodium bicarbonate crystals are grainy to the feel, settle rapidly, and have a barrel shaped, readily filterable structure. The ammonium chloride crystals are also readily filterable or centrifuged from the liquor. The bicarbonate crystals may be removed from the mother liquor on a vacuum filter of the type used in the ammonia-soda process or preferably by a type which provides several washing sections and allows re-use of the wash water from each section on one of the other sections. In order to reduce the volume of liquor to be handled in the filtration or centrifuging equipment, it is desirable to install conventional slurry thickeners before the filters or centrifuges. Each thickener is advantageously covered to prevent loss of ammonia. Provision is also made for recovery of ammonia vented from the system in the usual way by absorption.

Ammonium chloride removed from filter 10 is passed via line 28 to tank 29. Organic liquid is transferred from storage tank 30 via line 31. The slurry is agitated by suitable means for example a mechanical stirrer (not shown).

Organic liquid is removed from tank 30 by means of pump 32 and vaporized in boiler 33. The vapors pass via lines 34, 35 and 31 to slurry tank 29. Any water in the ammonium chloride charged is vaporized through line 36, condensed in cooler 37 and passed to liquid separator 38. Supernatant water is discarded through line 39 and the organic liquid is returned via line 40 to slurry tank 29. When the organic liquid is lighter than water the outlets from separator 38 are reversed.

The hot slurry, e. g. at about 150 to 170° C., is transferred by pump 41 through line 42 to mix tank 43. Hot fused sodium bisulfate, e. g. at about 340° to 360° C., is introduced via line 44. Suitable temperature, e. g. about 200° to 260° C., is maintained by superheated vapors of the organic liquid. The superheater 45 is fed with saturated vapors from boiler 33 via line 46 and delivers superheated vapors via line 47 to mix tank 43. As soon as the ammonium chloride slurry and sodium bisulfate come in contact and are heated by the organic vapors, hydrogen chloride is disengaged into the gaseous phase and a mixture of hydrogen chloride and organic vapor passed into overhead line 48. The slurry is charged to the top of acid stripping tower 49 via line 50. Further quantities of organic vapor are introduced from boiler 33 into the bottom of stripping tower 49 via line 34.

A mixture of organic vapor and hydrogen chloride passes from the stripping tower into line 48 which connects with the hydrogen chloride recovery system. From the bottom of the acid stripping tower a melt comprising a mixture of salts but largely sodium ammonium sulfate is removed to a vapor mixing tank 51 where organic vapors are also introduced via lines 34 and 52 from boiler 33. This heats and lifts the liquid through line 53 to the top of ammonia stripping tower 54, packed with any suitable packing. In the tank 51, a submergence of about ½ foot for each foot of lift is provided for line 53. Superheated organic vapor is introduced into the bottom of stripping tower 54 from the superheater 45 via lines 47 and 55 and a mixture of ammonia and organic vapor passes into line 56 leading to the ammonia recovery system. From the bottom of the ammonia stripper 54, sodium bisulfate is removed to a vapor mixing tank 57 where organic vapors from superheater 45 are introduced. The melt is thus returned via line 44 to mixing tank 43.

The mixture of hydrogen chloride and organic vapor passes through line 48 to the recovery system and into the bottom of condensing tower 57A which is operated with a bottom temperature of about 170° C. for orthodichlorobenzene, for example. From the bottom of the tower, organic condensate is removed by pump 58 and recycled through steam boiler 59 to the top of the tower through line 60. Excess of organic condensate over the necessary recycle to maintain a top tower temperature of about 150° C. is returned to a common solvent return line 61 leading to filter 62 to remove residual ammonium chloride suspended therein. Hydrogen chloride from the top of condensing tower 57A passes via line 63 to the base of secondary condensing tower 64. Additional quantities of organic vapor are condensed from the hydrogen chloride, the condensate being recycled by pump 65 from the bottom of tower 64 through water cooler 66 and line 67 to the top of tower 64. Hydrogen chloride from the top of the tower passes via line 68 to a sulfuric acid drier 69 where any trances of moisture are removed and then through chiller 70. Condensed organic liquid is removed in separator 71 and returned to filter 62 via line 72 (not shown). Pure hydrogen chloride is removed via line 73. Alternatively an active carbon or silica gel adsorbent system may be substituted for the drying and refrigeration stages to remove any moisture and the last traces of organic vapor from the hydrogen chloride.

The ammonia recovery system is similar to the hydrogen chloride recovery system using primary condensing tower 74, recycle pump 75, boiler 76 and line 77 for temperature control in the primary condensing tower 74. The ammonia passes via line 78 to secondary condenser 79, cooled by recycling organic condensate by means of pump 80 through cooler 81 via line 82 to the top of secondary condensing tower 79. Ammonia passes via line 83 to chiller 84 and separator 85. Pure anhydrous ammonia gas is removed via line 86. All of the organic recycle pumps 58, 65, 75, and 80 discharge the recovered organic liquid into a common return line 61 leading to filter 62 to remove residual ammonium chloride. In order to avoid corrosion, the liquid charged to the filter and thence eventually into the boiler should be free from hydrogen chloride. For this purpose, it is appropriate to insert a continuous sampler and tester 62A into line 61 just before the filter 62. The sampler-tester controls the addition of anhydrous ammonia as necessary to insure an excess thereof in the organic liquid. The filter is periodically backwashed via line 31 to slurry tank 29. The filtered organic liquid is heated in stripping tower 87 by superheated organic vapors introduced via line 88 and the stripped liquid returned to the intake of pump 32 via line 89. Organic vapors and stripped ammonia are returned to line 78 in the ammonia recovery section via line 90.

In the condensing sections of the recovery system, as shown in the drawing, two separate condensing towers are shown but if desired these may be combined into a single condensing tower. The appropriate size of the tower depends on the throughput, the availability of the cooling water or other refrigerant and the degree to which removal of organic vapor from the product gas is desired.

Steam produced in boilers 59 and/or 76 is passed via line 91 to the steam chests of several single effect evaporator bodies 92, 93 and 94 into which a saturated brine is introduced respectively through lines 95, 96 and 97. A salt slurry is withdrawn through lines 98, 99, and 100, settled and the salt filtered and dried in equipment not shown. The solid salt is then passed to mixing tank 22 through line 23. If desired, damp salt from the filter may be added directly to the mixing tank 22 without first drying; however, the ammonium chloride yield is reduced slightly due to the water added with the salt.

In operation, the proportion of ammonium chloride in the melt circulated through the stripping stages approximates about 0.15 to 0.50 mole of ammonium chloride per mole of bisulfate, and advantageously about 0.20 to 0.35:1 mole. As the proportion of ammonium chloride falls below 0.15 an uneconomical proportion of bisulfate recycle is required compared to the amount of product recovered. The proportion of ammonium chloride may range up to say 0.75 to 1, but above about 0.75 to 1 too much ammonium chloride comes off with the hydrogen chloride which complicates the recovery procedure and tends to increase ammonium chloride vaporization. For good yields based on the ammonium chloride charged, operation among the lower concentration ranges, say 0.2 to 0.35 mole of ammonium chloride per mole of bisulfate, where severe stripping conditions can be employed without undue vaporization of ammonium chloride is preferred. The concentration of ammonium chloride in the charge slurry usually comprises about 20 to 25 per cent of the ammonium chloride admixed with about 75 to 80 per cent of the organic liquid. Slurries of lower concentration, as low as about 5 per cent, may be used but excessive amounts of organic liquid must then be vaporized and condensed. Furthermore, solidification of the bisulfate is to be avoided and this may be more difficult with excessive proportions of organic liquid. The concentration of the slurry is limited by pumping and settling difficulties within the transfer system.

The bisulfate melt must be maintained at a temperature above 170° C., its melting point. It is desirable, however, to provide a margin of safety to prevent the melt from setting up anywhere in the system by maintaining the temperature at all points above about 200° to 220° C. In the hydrogen chloride stripping zone a temperature within the range of about 220° to 270° should be maintained. The temperature should be maintained below about 300° C. in order to avoid the sublimation of considerable amounts of unreacted ammonium chloride. Operation at the highest temperature consistent with low ammonium chloride vaporization is preferred in order to favor the hydrogen chloride evolution and minimize the quantities of stripping medium or the degree of vacuum required. Temperatures of about 240–260° C. are preferably maintained in the hydrogen chloride stripper.

The temperature in the ammonia stripping zone should be maintained at about 330° to 380° C. Again operation at the highest temperature level consistent with good yields is preferred, for example, a temperature within the range of 340° to 360° C. In the range of 360° to 400° C. a substantial vapor pressure of ammonium sulfate is developed. Under the preferred operating conditions, only a conversion per pass of 80 to 90 per cent is obtained and as much as about 20 per cent of the ammonium chloride is vaporized, recovered, and continuously recycled. Thermal requirements and the quantity of stripping medium required are reduced accordingly and product recovery procedure is simplified.

While the process is operated at substantially atmospheric pressure or only such pressures necessary to promote circulation of the fluids, somewhat reduced pressure may be advantageous in order to facilitate the removal of the product gases from the melt. For example, by reducing the pressure in the stripping sections to ½ atmosphere the stripping temperatures may be reduced, while obtaining the same conversion per pass. In such an operation less organic vapor is required to obtain the desired results.

The organic medium employed advantageously is a liquid of sufficiently high boiling point to facilitate its separation from the product vapors in the product recovery zones. The organic liquid must be stable in the vapor phase at temperatures permitting the introduction of sufficient heat into the system to effect the desired separating and stripping reaction without requiring unreasonable ratios of organic liquid to ammonium chloride. An organic liquid which is substantially stable at 500° C. or higher is satisfactory. The vapor also must be stable under the conditions of the stripping zone and must be chemically inert with respect to the reaction materials. Many of the chlorinated aromatics are highly effective. Suitable examples are chlorobenzene and orthodichlorobenzene, particularly a stabilized orthodichlorobenzene, such as Dowtherm E. Higher boiling chlorinated aromatics, such as mixed isomeric trichlorobenzenes or the Arochlors (chlorinated diphenyls) also are suitable since in general they are stable at temperatures of about 500° C. Although the requirements for the organic medium are rather exacting they are not necessarily related to chemical structure or composition and therefore a broad range of vaporizable heat stable organic liquids having the requisite chemical inertness within the reaction system are available. For example, benzene itself is useful since it has a high degree of thermal stability. However, it has the disadvantage of a low boiling point which makes its separation from the product gases more difficult than in the case of the higher boiling liquids and its flammability introduces a serious fire hazard.

Sodium bisulfate is preferably used as the reacting acid sulfate because of its low cost and availability. The other alkali metal bisulfates and ammonium bisulfate also are useful. A mixture of about 50 to 75 per cent of sodium bisulfate with ammonium bisulfate is particularly advantageous since it has the lowest melting point and, when melted, the lowest viscosity of any of the acid sulfates or acid sulfate mixtures. Other mixed melts may be employed, e. g. potassium bisulfate or lithium bisulfate containing melts or three component melt mixtures.

We claim:

An integrated process for the production of sodium bicarbonate, ammonia, and hydrogen chloride from solid salt, carbon dioxide, ammonia and water which comprises circulating a sodium, ammonium, chloride, hydroxide and bicarbonate ion containing aqueous liquor between a sodium bicarbonate producing stage and an ammonium chloride producing stage, adding carbon dioxide to the ammoniated salt-containing liquor in the sodium bicarbonate producing stage, separating crystallized sodium bicarbonate, adding less than the molar requirement of make-up water for a complete cycle to the liquor which is recovered and circulated in the ammonium chloride producing stage, adding approximately half but less than the molar requirement of ammonia to the circulating liquor, adding solid sodium chloride, controlling the temperature of the liquor while dissolving the sodium chloride and separating crystallized ammonium chloride, adding the remaining make-up water and ammonia to the liquor recovered, circulating the liquor to the sodium bicarbonate producing stage, drying the separated crystallized ammonium chloride, mixing a slurry of ammonium chloride in an inert thermally stable organic liquid with a melt of a bisulfate, circulating the ammonium chloride containing melt through successive hydrogen chloride and ammonia stripping zones, controlling the stripping temperatures in the hydrogen chloride and ammonium stripping zones by direct injection of externally heated vapors of the organic liquid, separately removing a vapor stream and the partially stripped melt from the hydrogen chloride stripping zone, separately removing a vapor stream and the stripped melt from the ammonia stripping zone, returning the stripped melt to the mixing zone, introducing the vapor stream removed from at least one of the stripping zones into a condensing tower of a multistage condensing system, partially condensing the vaporized organic liquid with relatively cool organic liquid, withdrawing organic condensate from the condensing tower, passing a portion of the condensate through a cooler, returning relatively cool organic condensate from the cooler to the condensing tower, separately recovering hydrogen chloride and ammonia, recovering heat in the form of steam from the waste heat recovery unit, and evaporating brine with the recovered steam to provide solid sodium chloride for addition to the ammonium chloride producing stage.

WARREN STANDISH MILLER.
LOUIS C. HIRDLER.

No references cited.